(12) United States Patent
Ai et al.

(10) Patent No.: US 6,816,315 B1
(45) Date of Patent: Nov. 9, 2004

(54) OPTICAL PATH LENGTH TUNER

(75) Inventors: Chiayu Ai, Newark, CA (US); Yung-Chieh Hsieh, San Jose, CA (US); Dar-Yuan Song, Irvine, CA (US)

(73) Assignee: Optoplex Corporation, Fremont, CA (US)

( * ) Notice: Subject to any disclaimer, the term of this patent is extended or adjusted under 35 U.S.C. 154(b) by 38 days.

(21) Appl. No.: 10/287,340

(22) Filed: Nov. 4, 2002

Related U.S. Application Data (60) Provisional application No. 60/339,727, filed on Nov. 2, 2001.

(51) Int. Cl.⁷ .................................... G02B 27/14
(52) U.S. Cl. ........................... 359/637; 359/629
(58) Field of Search ..................... 359/637, 629, 359/638, 583

(56) References Cited

U.S. PATENT DOCUMENTS 6,275,322 B1 * 8/2001 Tai .............................. 359/279

* cited by examiner

Primary Examiner—David N. Spector
(74) Attorney, Agent, or Firm—Antonio R. Durando; Quarles & Brady Streich Lang (57) ABSTRACT

A parallel glass plate mounted on a rotating fixture is used to precisely control the optical path length of a light beam. The glass plate refracts the incident optical signal to increase the length of its optical path as a function of the angle of incidence. The device can easily achieve a precision in the order of nanometers and is particularly suitable to fine tune the cavity length of a resonator and the optical path difference of an interferometer. Accordingly, the preferred application of the invention is in an interferometric interleaver. The glass plate can also be coated with a partially reflective coating to attenuate the optical signal passing therethrough. By judiciously selecting the refractive index, the thermal coefficient of refraction, and the coefficient of thermal expansion of the glass, thermal effects may be virtually eliminated.

15 Claims, 10 Drawing Sheets

OPTICAL PATH LENGTH TUNER

RELATED APPLICATIONS

This application is based on U.S. Provisional Ser. No. 60/339,727, filed Nov. 2, 2001.

BACKGROUND OF THE INVENTION

1. Field of the Invention

This invention pertains to the general field of optical communications and, in particular, to a compensating device for adjusting the optical path length of a wavefront.

2. Description of the Prior Art

The proper functioning of optical devices is often predicated upon the precise control of the optical path length of a wavefront traversing the device. For example, phase-shift interferometers vary the optical path difference between a test beam and a reference beam by translating the reference mirror in a very precise manner along the optical path of the reference beam. Another example, particularly relevant to the preferred embodiment of the invention, lies in the structure and function of optical interleavers.

In dense wavelength division multiplexing (DWDM) optical communication, various frequencies (wavelengths) of $1/\lambda$ laser light are used as carrier signals (channels) and are coupled into the same optical fiber, which acts as a waveguide. Data signals are superimposed over the carrier signals and are transported in the waveguide. An interferometric interleaver is commonly used in the art to separate the channels into distinct optical signals.

Figure 1:
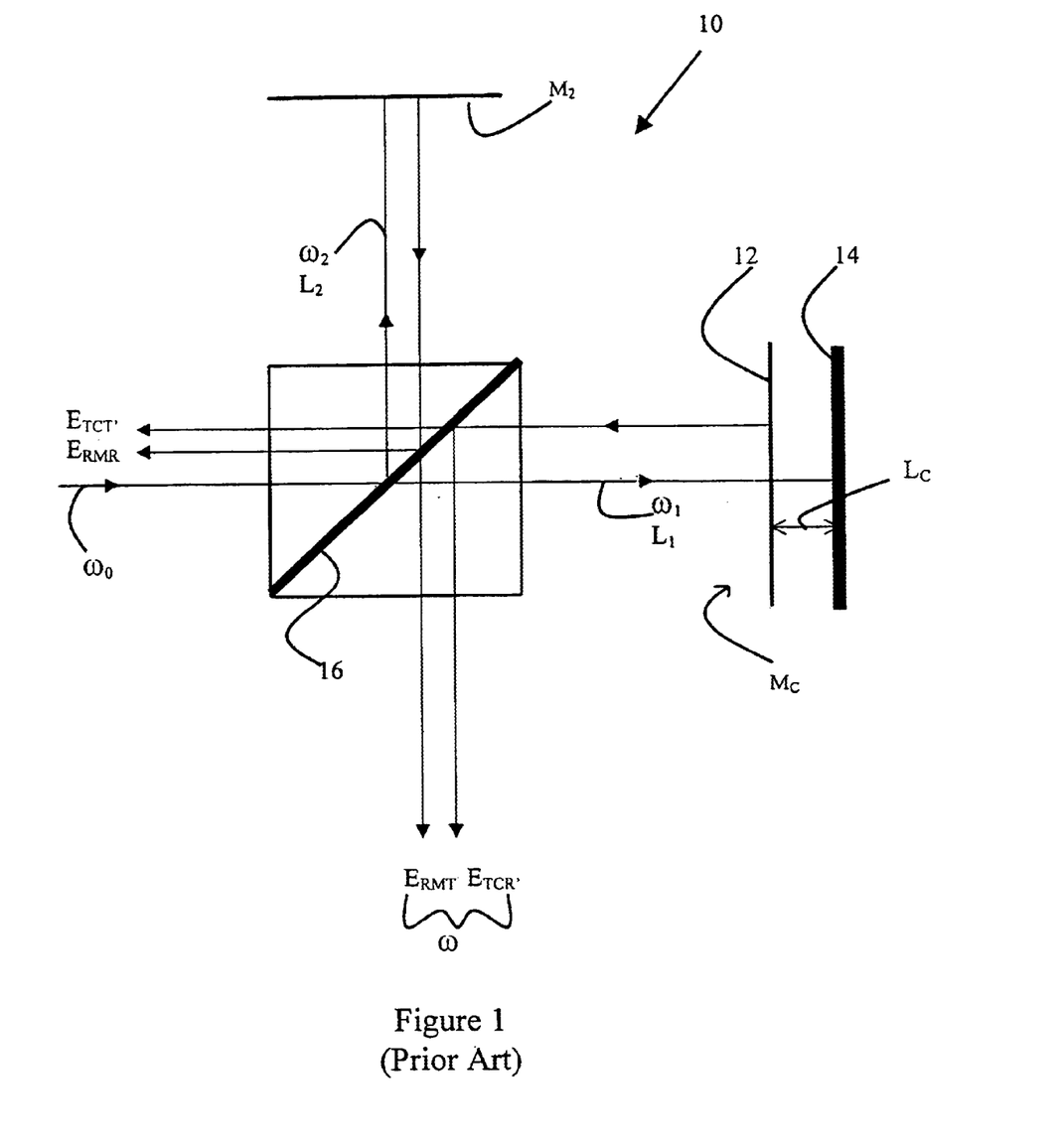
FIG. 1 illustrates schematically an interleaver device based on a step-phase interferometer.

Referring to the drawings, wherein like parts are designated throughout with like numerals and symbols, FIG. 1 illustrates schematically a step-phase interferometer used as an interleaver device. A multi-channel optical input $W_0$ is passed through a beam splitter 10 which splits the beam into a first wavefront $W_1$ transmitted toward a Gires-Tournois resonator (GTR) device $M_c$ (also known in the art as an "etalon") and a second wavefront $W_2$ reflected toward a mirror $M_2$. The GTR includes a front surface 12 and a parallel back surface 14 with very low and very high reflectance, respectively. The GTR $M_c$ and the mirror $M_2$ are positioned at distances $L_1$ and $L_2$, respectively, from the interface 16 of the splitter 10. The GTR causes a phase shift in the wavefront $W_1$ which is returned to and partially reflected by the beamsplitter 10 to produce a beam $E_{TCR}$, in a first output arm of the step-phase interferometer and is partially transmitted to produce a beam $E_{TCT}$ in a second output arm of the interleaver. Similarly, the wavefront $W_2$ is reflected from the mirror $M_2$, is partially transmitted by the beamsplitter 10 to produce a beam $E_{RMT}$ in the first output arm, and is partially reflected to produce a beam $E_{RMR}$ in the second output arm of the interleaver. The notation used in this disclosure, wherein T, R, M and C refer to transmission, reflection, mirror and cavity (resonator), respectively, and the prime symbol (') refers to the internal optical path, is conventional in the art.

As those skilled in the art would readily recognize, the ability to set very precisely $L_1$–$L_2$ and $L_c$, the distance between the front and back surfaces 12,14 of the etalon $M_c$, is critical to the operation of the interleaver. In a 50 GHz interferometric interleaver, for example, the cavity length $L_c$ must be controlled to a precision of a few nanometers, which in the art can only be achieved by using complex and expensive structural features and manufacturing techniques. Furthermore, because structural properties are greatly affected by temperature changes, thermal effects constitute an additional challenge in providing reliable and stable performance of etalons and interleavers.

In view of the foregoing, there is still a need for an extremely accurate and relatively inexpensive way of controlling the optical path length of a wavefront. There is also a need for a path-length adjustment mechanism that is relatively insensitive to thermal effects. The present invention provides simple solutions to that end.

BRIEF SUMMARY OF THE INVENTION

Figure 2:
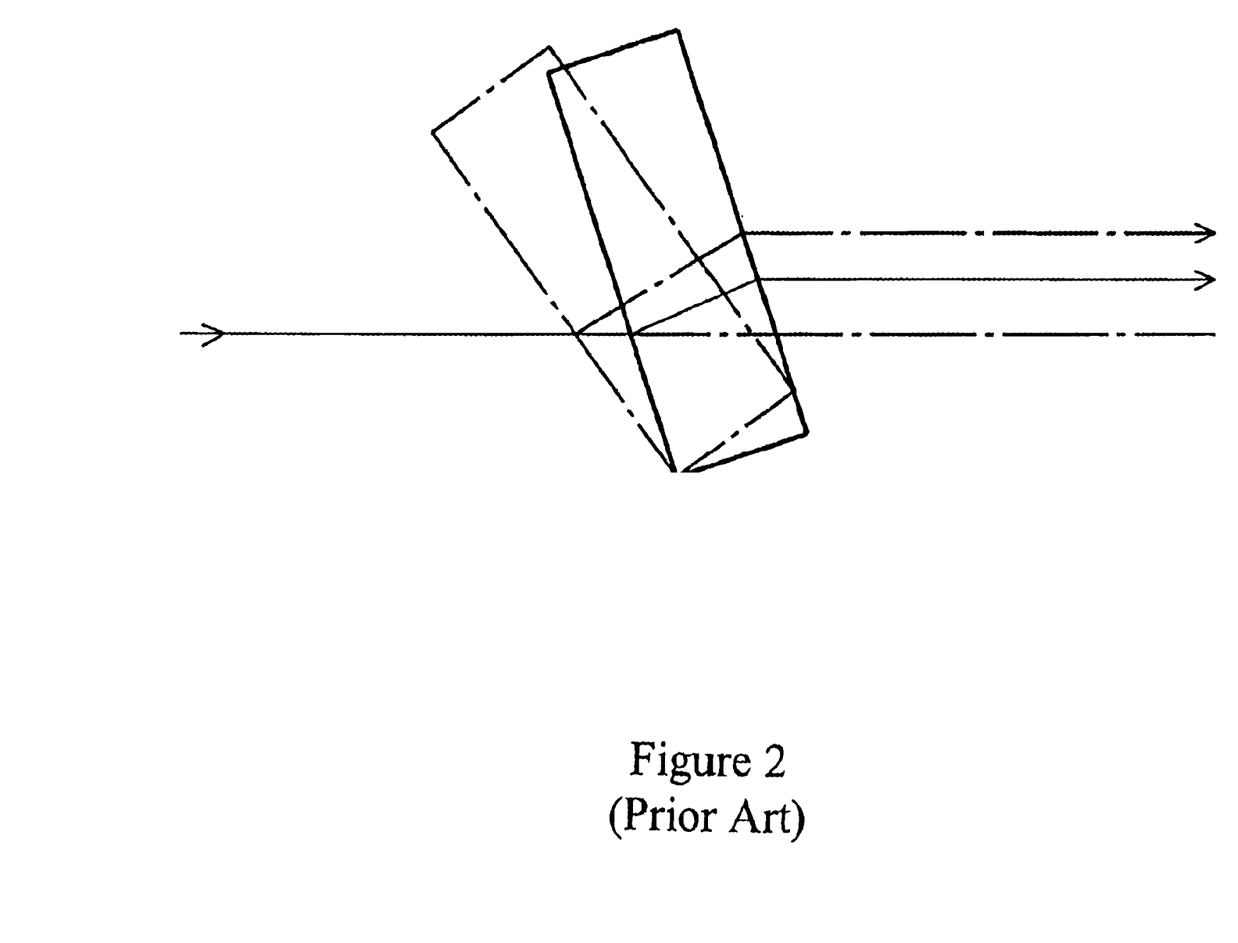
FIG. 2 is a schematic representation of the lateral shift produced by a parallel glass plate on an incident light beam.

This invention is based on the realization that a parallel glass plate can be used advantageously to fine tune the optical path length of a light wavefront with a degree of accuracy in the order of nanometers. It is known that a parallel glass plate will translate laterally an incident beam along an axis parallel to the incident optical axis by an amount that depends on the distance between the parallel surfaces in the plate, the index of refraction of the glass, and the angle of incidence of the beam. This property is often used to correct the optical axis position in optical apparatus. As illustrated in FIG. 2, the property can also be used to shift laterally the position of the output beam simply by rotating the glass plate and, therefore, changing the angle of incidence of the input beam.

One aspect of the invention consists of combining a parallel glass plate and a rotating fixture and placing the resulting assembly in the optical path of the wavefront requiring fining tuning. As the wavefront passes through the plate, its path length within the glass is affected by the degree to which it is refracted, which in turn is a function of the angle of incidence of the incoming beam. Thus, the optical path length of the wavefront can be changed advantageously by varying its angle of incidence to the plate. Inasmuch as the motion of a rotating fixture can be controlled easily and very precisely with a mechanical actuator, the rotating glass plate of the invention provides a simple and effective way to fine tune the optical path length of any optical device where such length is critical to performance.

According to the preferred embodiment of the invention, a refractive parallel glass plate mounted on a rotating fixture, hereafter referred to as a "frequency window," is used to precisely control the length of the optical beams in the two arms of an interleaver device. A frequency window is placed in the path of the wavefront $W_2$ reflected by mirror $M_2$ in one arm of the interleaver and the other window is placed in the other arm in the cavity of the etalon $M_c$ (FIG. 1). By rotating each frequency window, the cavity length $L_c$ and the optical path difference ($L_2$–$L_1$) in the two arms of the interleaver can be adjusted to a degree not attainable by mechanical means.

According to another important aspect of the invention, the material used in the construction of the frequency window can be selected so as to produce a thermally stable device. Based on the general relationship between index of refraction, coefficient of thermal expansion and temperature in a medium, it can be shown that the rate of change of the refractive index is a function of temperature. Therefore, by judiciously choosing a material with the appropriate refractive index n, dn/dT, and coefficient of thermal expansion, it is possible to construct a frequency window with negligible temperature dependence.

Those skilled in the art will understand that the same concepts can be used to finely tune the optical path length of light in other applications. For example, the invention may be used to adjust the path length of a wavefront in any interferometric profiler. Therefore, a broad benefit of this invention is the precise control of the length of a light path.

Another important benefit of the invention resides in the fact that it enables the implementation of a thermally stable configuration.

Still another benefit of the invention is the reduction of the complexity and cost of manufacturing highly precise etalons and other devices that require accurate control of the optical path length.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

Figure 3:
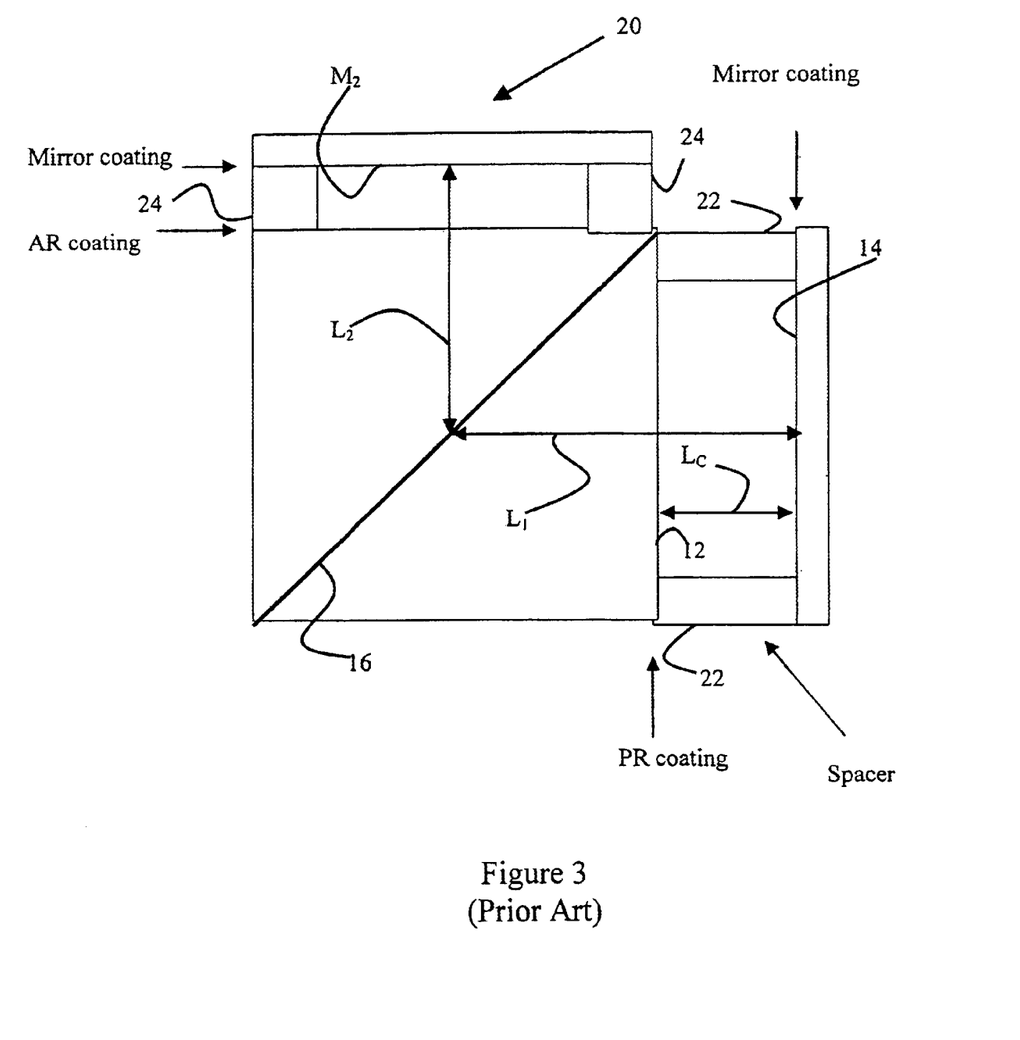
FIG. 3 is a schematic representation of the structural components of a conventional interleaver using spacers to establish the length of the etalon cavity and the optical path difference between the two arms of the device.

Also referring to FIG. 1, FIG. 3 illustrates schematically the structure of a conventional interleaver device 20 where air spaces between a transparent body incorporating the beamsplitter 16 and reflective mirrors $M_2$ and 14 are used to provide the flexibility required to set the cavity length $L_c$ and the optical path difference $L_2$–$L_1$. A first set of spacers 22 determines the distance between the two etalon surfaces 12 and 14. A second set of spacers 24 establishes the distance $L_2$ between the beam splitter 16 and the mirror $M_2$, thereby also setting the optical path difference $L_2$–$L_1$. Clearly, the precision with which these distances can be set is limited by the tolerances of machining and measuring equipment. In addition, both $L_c$ and $L_2$–$L_1$ are unavoidably susceptible to variations as a result of thermal effects on the materials used to construct the spacers 22,24. As used herein, the term "spacer" refers to any structural component that creates an open space between optical surfaces, such as the face of a beamsplitter and the reflective surface of a mirror, whether or not the spacer is integral with other structures.

Figure 4:
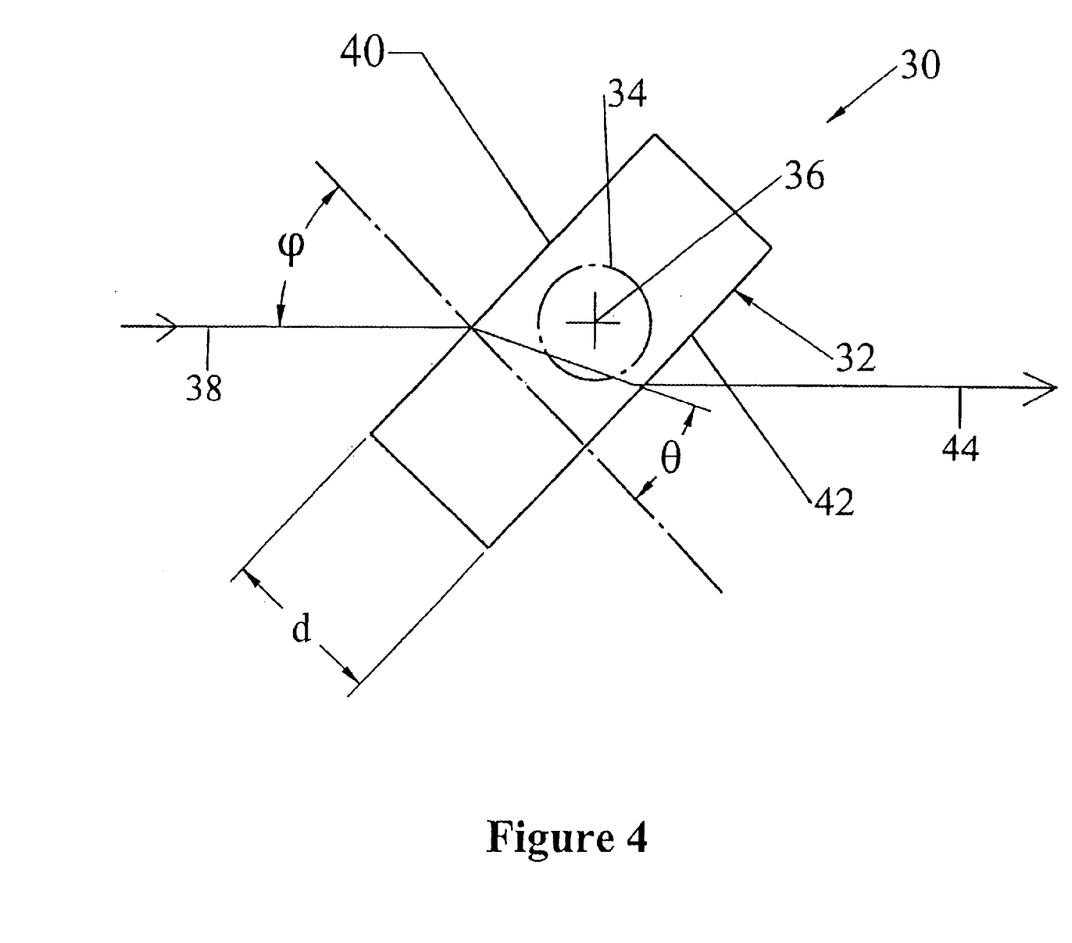
FIG. 4 is a schematic representation of a parallel glass plate mounted on a rotating fixture to illustrate a frequency window according to the present invention.

A frequency window 30 according to the invention is illustrated in FIG. 4. A parallel glass plate 32 is mounted on a fixture 34 (shown in phantom line) adapted for rotation about an axis 36 perpendicular to the direction of propagation of an incident light beam 38. As the beam passes through the plate 32, its direction is altered by refraction at the point of incidence at the first interface 40 between air and glass, and it is again altered at the point of emergence at the second interface 42 between the two propagation media to produce an output beam 44 substantially parallel to the incident beam 38. It is clear to those skilled in the art that the distance traveled by the light trough the glass plate 32 depends on the thickness d of the plate and on the angle of refraction $\theta$, which in turn is a function of the angle of incidence $\phi$. Thus, as the frequency window 30 is rotated around the axis 36, the distance of light propagation within the glass medium varies and correspondingly affects the optical path length of the beam 38.

The effects of rotation of each frequency window can be calculated applying well known optical relationships. For example, the optical path length (OPL) of a beam traveling through a frequency window in an etalon having a cavity length L (herein defined as the effective cavity length) is determined by the following equation:

$$OPL(\phi) = L - \frac{d}{\cos\theta}\cos(\phi - \theta) + \frac{nd}{\cos\theta} \qquad (1)$$
$$= L - d\cos\phi + d\sqrt{n^2 - \sin^2\phi}$$

wherein d is the thickness of the plate, n is the refractive index of the plate material, $\phi$ is the angle of incidence to the plate, and $\theta$ is the corresponding angle of refraction through the plate material.

At normal incidence, Equation 1 reduces to $$OPL(0) = L + (n-1)d \qquad (2)$$

Thus, the optical path difference (OPD) between the OPL at an arbitrary angle of incidence $\phi$ and the OPL at a zero-degree angle is given by:

$$OPD = OPL(\phi) - OPL(0) \qquad (3)$$
$$= d\left[\sqrt{n^2 - \sin^2\phi} - \cos\phi - (n-1)\right]$$

Figure 5:
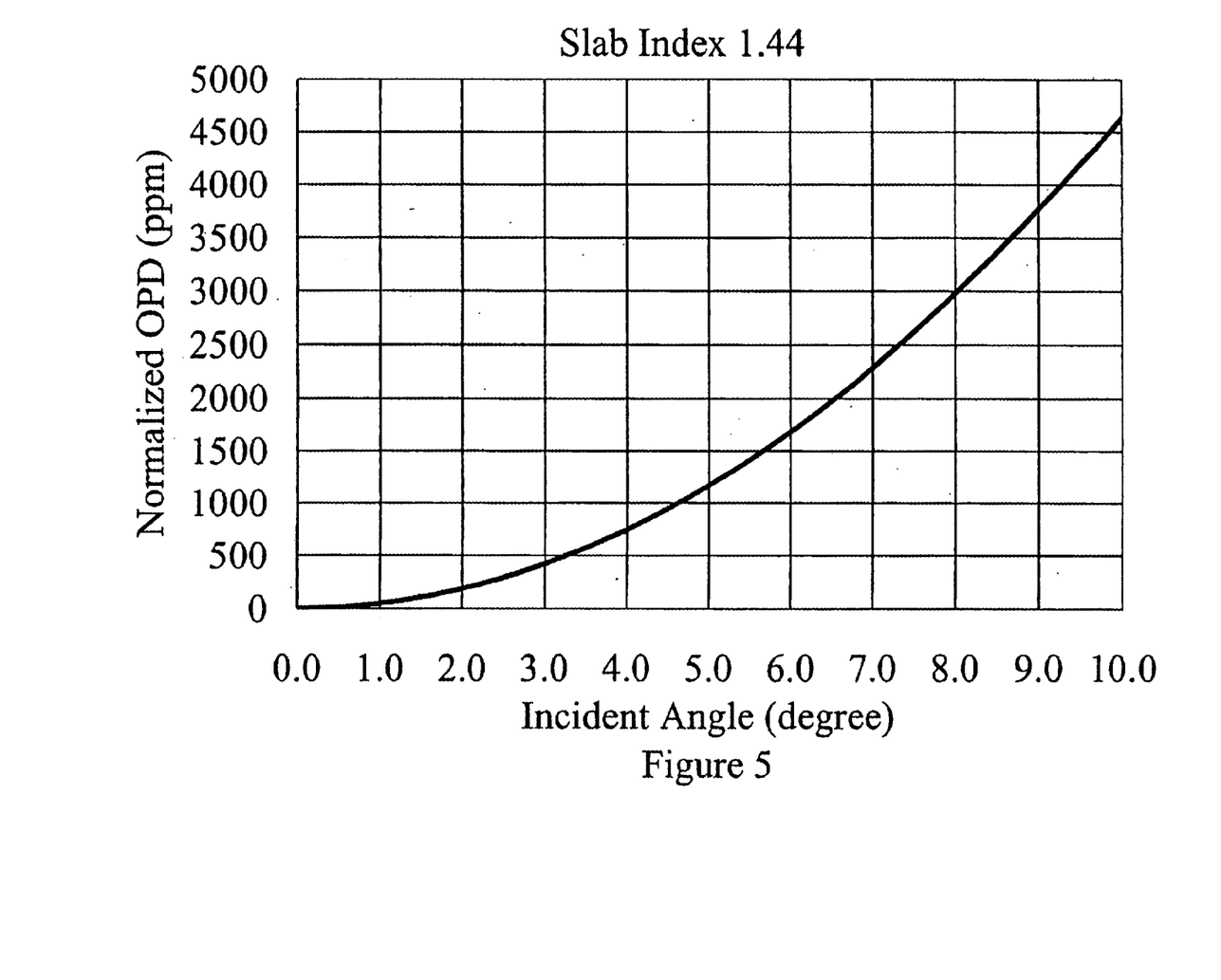
FIG. 5 is a graph illustrating the normalized optical path difference with respect to normal incidence of a wavefront traveling through the frequency window of the invention as a function of the angle of incidence over a ten-degree range for a glass plate having refractive index of 1.44.
Figure 6:
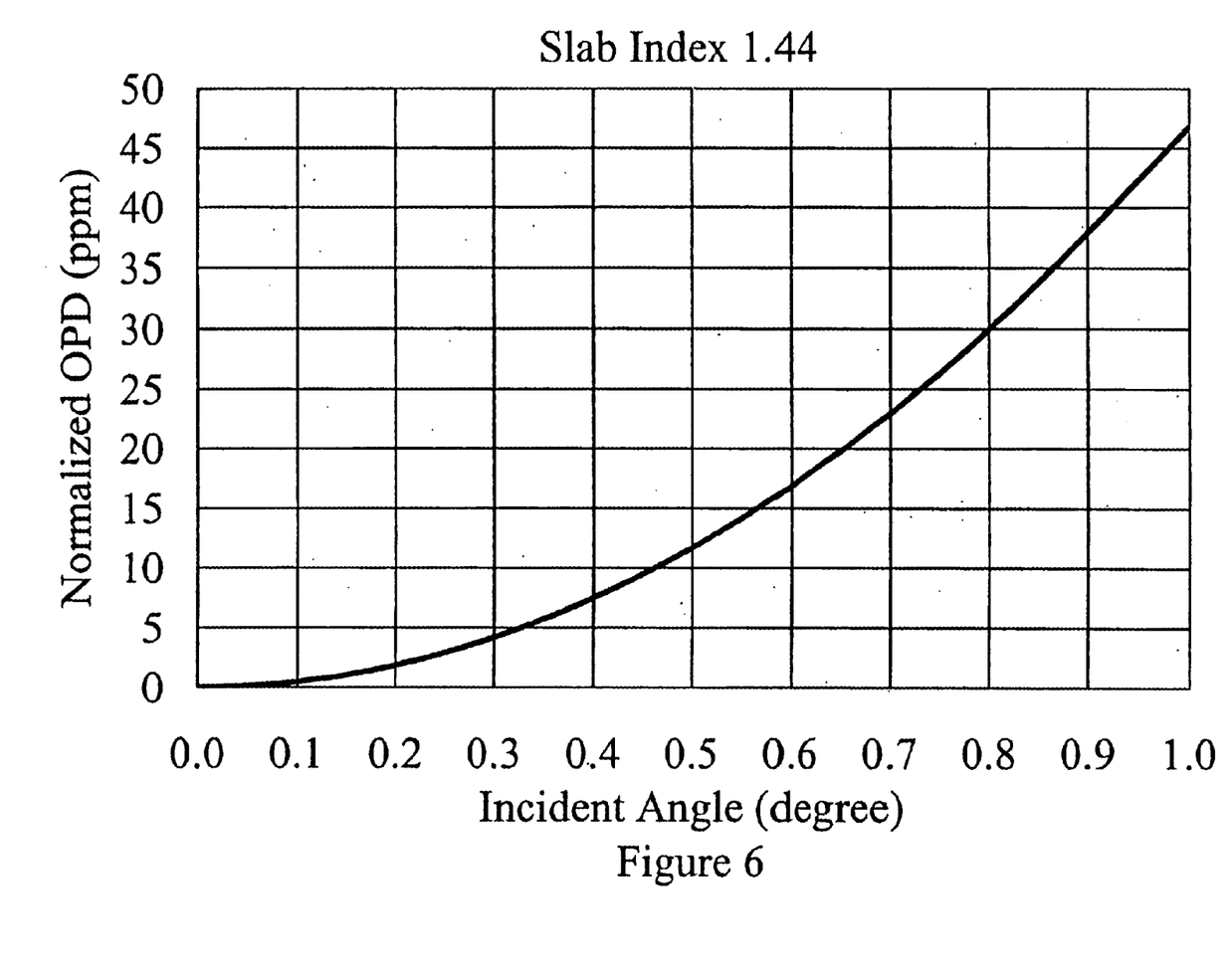
FIG. 6 is a graph corresponding to FIG. 5 illustrating the change in the normalized optical path difference of the wavefront as a function of the angle of incidence over a one-degree range.
Figure 7:
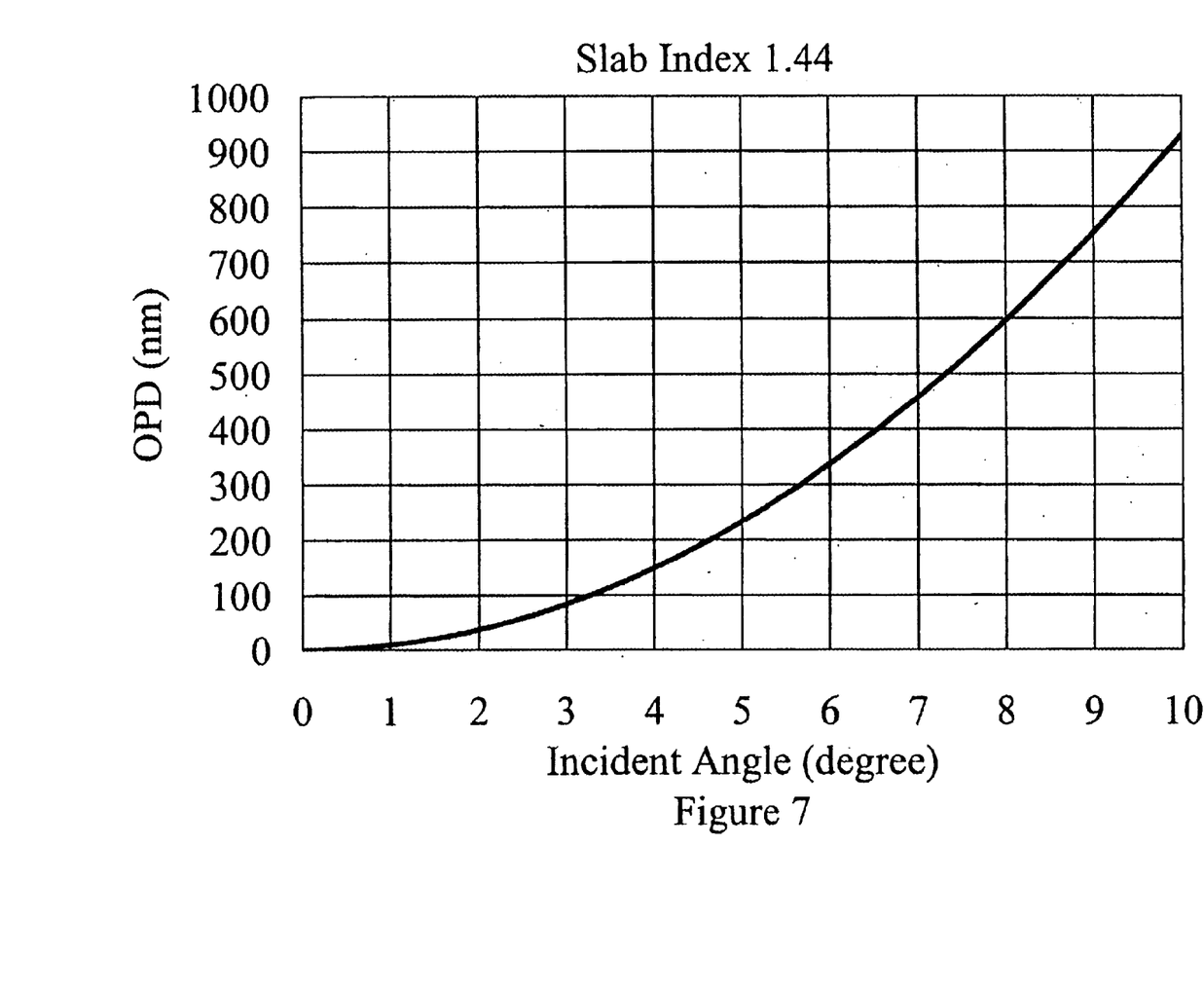
FIG. 7 is a graph illustrating the change, as a function of the angle of incidence, in the optical path difference from normal incidence of a wavefront traveling through a frequency window having a thickness d=200 $\mu$m and a refractive index of 1.44.

Based of Equation 3, FIGS. 5 and 6 illustrate graphs of normalized OPD (defined as OPD/d) with respect to normal incidence as a function of the angle of incidence for relatively large (10 degrees) and small (1 degree) rotation, respectively, for a glass plate with refractive index of 1.44. The OPD for a frequency window of thickness equal to 200 $\mu$m and a refractive index of 1.44 is illustrated in FIG. 7. These figures illustrate that when the angle of incidence is small the OPD has an approximately quadratic dependence on the angle of incidence, and also shown by the corresponding mathematical relation, $$OPD \approx d\frac{\phi^2}{2}\left(\frac{n-1}{n}\right) \quad (4)$$

Therefore, at small angles, a significant change in the angle of incidence will produce a small and precise change in the OPD. For example, for a frequency window with a thickness of to 200 micrometers and a refractive index of 1.44, a change of the incidence angle $\phi$ from zero to one degree will produce an OPD of only 9.3 nanometers. Since it is much easier to control the angular rotation than the linear motion of a structure, the use of a rotating frequency mirror according to the invention makes it possible to finely adjust the optical path length of an incident light beam with a precision in the order of nanometers.

Figure 8:
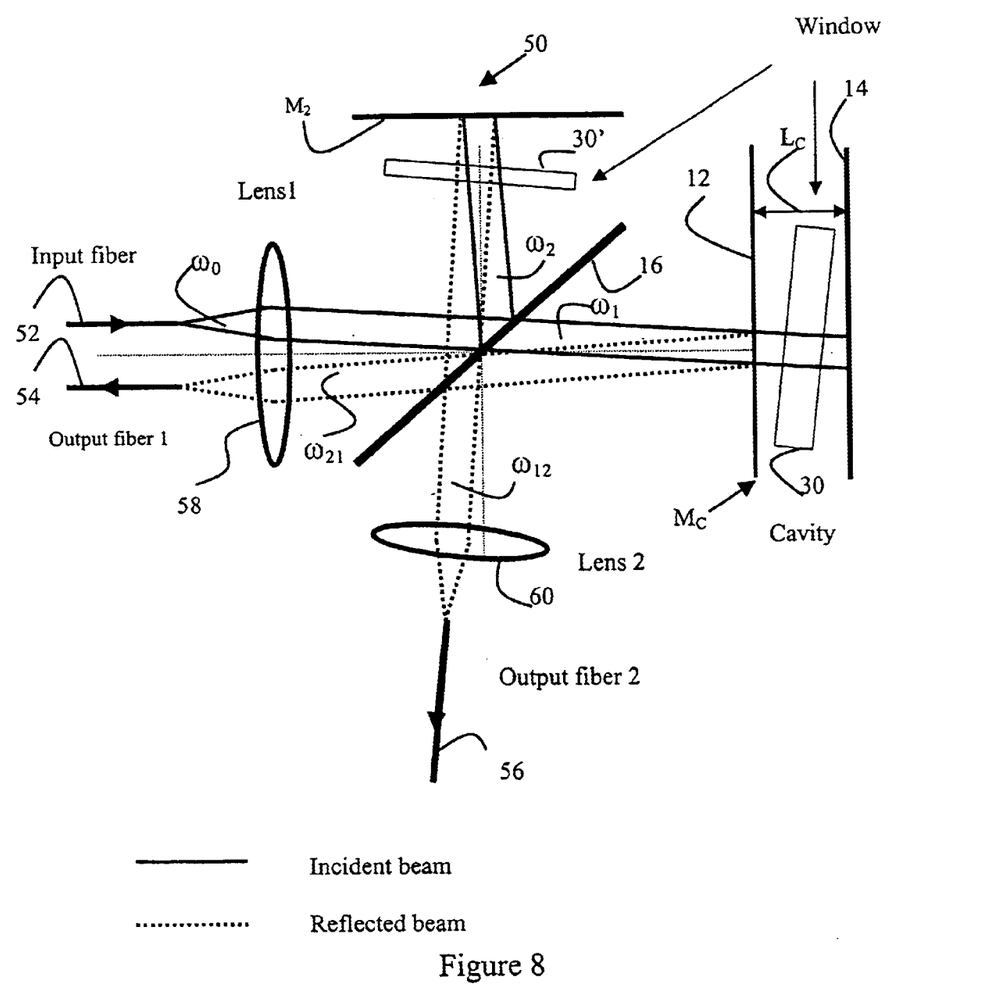
FIG. 8 shows two frequency windows combined with a conventional interferometric interleaver according to the invention in a de-multiplexer application.
Figure 9:
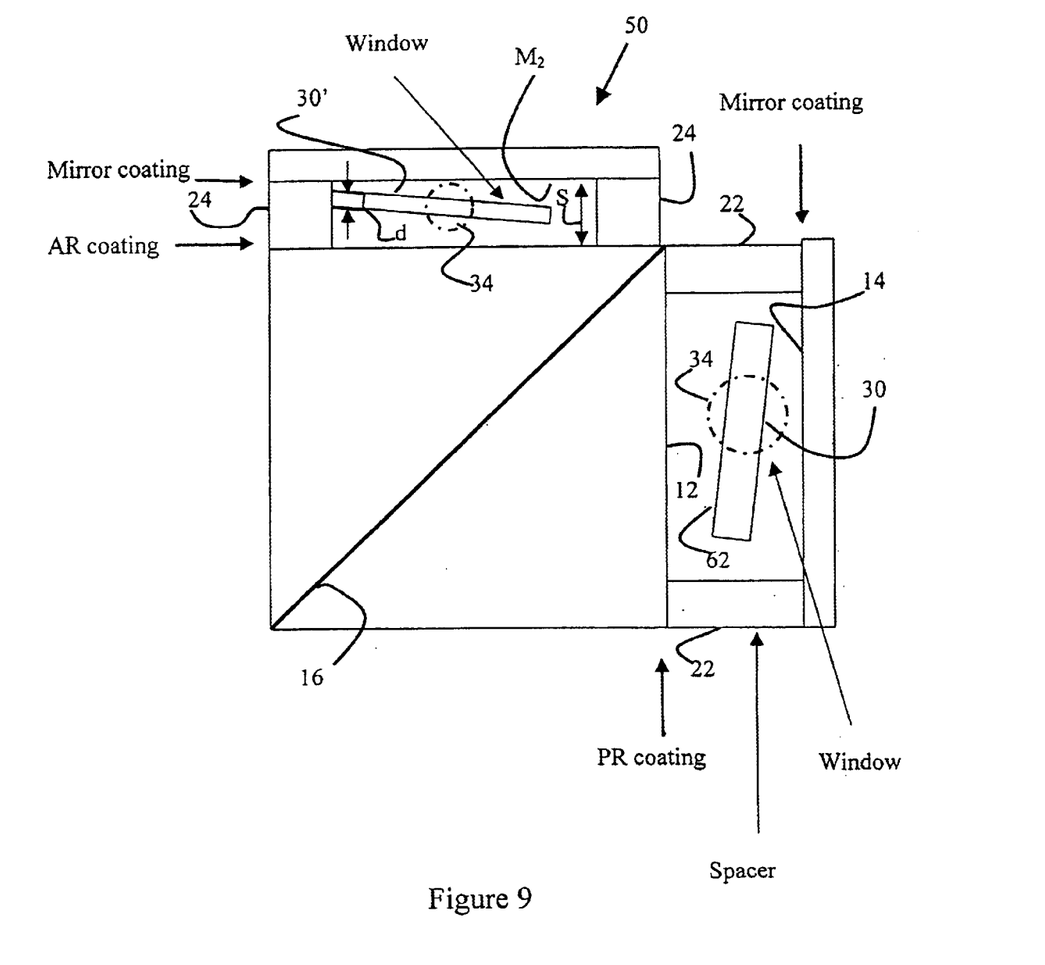
FIG. 9 shows the frequency windows of the invention combined with the interleaver of FIG. 3.

FIG. 8 illustrates schematically two frequency windows 30 in an interferometric interleaver 50 used as a de-multiplexer. FIG. 9 illustrates the structural components of the invention in a conventional physical configuration corresponding to the interleaver of FIG. 4. An input optical fiber 52 delivers a multi-channel light beam $W_0$ to the interleaver. The beam strikes the beamsplitter 16 which produces two wavefronts $W_1$ and $W_2$, as detailed with reference to FIG. 1. Two resulting output beams $W_{21}$ and $W_{12}$, each carrying de-multiplexed channels following reflection and interference between beams $W_1$ and $W_2$, are fed into output optical fibers 54 and 56, respectively, through respective collimating lenses 58 and 60. By placing a frequency window 30 in the optical path of $W_1$ within the cavity of the etalon $M_c$, the effective length of the cavity is determined by the angle of incidence of $W_1$ upon the frequency window. Similarly, a second frequency window 30' placed in the optical path of $W_2$ toward the mirror $M_2$ determines the effective length of the distance $L_2$ between the beamsplitter and the mirror. Accordingly, the frequency mirror 30' may be used to set the optical path difference $L_2-L_1$, between $W_2$ and $W_1$. It is noted that the position of the first frequency window 30 will affect not only the cavity length $L_c$ of the etalon, which is critical to its performance, but also the overall path length $L_1$ of the transmitted beam $W_1$. Once the etalon's specifications are set, though, the path length $L_1$ is also set and the second frequency window 30' can be used advantageously according to the invention to fine tune the optical path difference $L_2-L_1$.

In order to maintain a fixed effective path length in a device, such as within the cavity length $L_c$ of an etalon, it has been very desirable to manufacture the spacers used to establish optical path length using athermal materials. This has been very difficult to accomplish because all materials exhibit some form of temperature-dependent dimension. According to another important aspect of the present invention, the use of a frequency window affords the ability to compensate for thermal effects on the structural spacers used in the manufacture of the device. If the spacers are athermal, then the window material should also be athermal. That is, the thermo-optical constant G of the material used in the frequency window should approximate zero. Analytically, $$G \equiv (n-1)\alpha + \frac{dn}{dT} \approx 0 \quad (5)$$

where n and $\alpha$ are the refractive index and the coefficient of thermal expansion, respectively, of the refractive material used in the frequency window, dn/dT is the thermal coefficient of refraction of the material, and T is temperature.

Thus, by judiciously selecting a material with the appropriate n and $\alpha$, it is possible to provide a frequency window with essentially athermal performance. For example, a glass with index of refraction n=1.6, a thermal coefficient of refraction dn/dT=5.9×10$^{-6}$/°K, and a coefficient of thermal expansion $\alpha$=1×10$^{-5}$/°K will have a thermo-optical constant substantially equal to zero within the normal temperature range of operation of an optical device. When, on the other hand, the thermal characteristics of the spacers used in a device are not negligible, it is desirable to manufacture the frequency window from a material which will compensate for thermal effects. That is, n, dn/dT, and $\alpha$ should be selected so that the change in the optical path length created by the window matches the absolute value of the thickness change created by the thermal effect on the spacers, but is opposite in sign, within the temperature range of operation of the device. That is, neglecting air effects, the following condition is met:

$$[(n-1)\alpha+dn/dT]d+\beta S=0 \quad (6)$$

where d and S are the thickness of the window and of the spacer, respectively, and $\beta$ is the coefficient of thermal expansion of the spacer material (see FIG. 9). It is noted that the temperature dependence of the index of refraction of air also needs to be taken into account for precise compensation. As is well understood in the art, the air component can be approximated by the quantity $dn_{air}/dT$ (S-d), which is added to the left side of Equation 6. However, if the device is under vacuum or is hermetically sealed, air effects can be disregarded without loss of utility in most applications of the invention.

In the ideal case, both refractive faces 40,42 (see FIG. 4) of the frequency window of the invention are coated with anti-reflective material to obtain maximum transmittance and optical-power output. However, if the reflectivity of the beam splitter 16 used in the interleaver is less than 50%, the optical power in the two arms of the device may not be equal, with a resulting degradation of the channel-isolation performance of the interleaver. In that case, the frequency window of the invention can be used advantageously also to attenuate one of the beams so that the two output signals are balanced. This can be accomplished by coating one or both sides of the glass plate 32 with partially reflective material 62, as illustrated in FIG. 9. Alternatively, beam attenuation may be attained by incorporating a wedge in the frequency window plate (that is, by introducing a small angle between the opposing faces 40,42 of the plate 32). This has the effect of changing the angle with which the corresponding output beam impinges on the focusing lens, which in turn affects the coupling efficiency of the beam into the output fiber.

As illustrated by these embodiments, the invention provides a simple and precise way to control the optical path length of optical signals, and it may be implemented easily and at low cost of manufacture using conventional components in any optical device. As would be clear to one skilled in the art, although the invention has been described in terms of a parallel glass plate, any refractive material with appropriate optical properties may be used in similar manner. In addition, the position of the axis of rotation of the window assembly is not critical to the invention, although it is generally preferably perpendicular to the optical path of the incident beam, as illustrated in the interleaver application. In some applications it may be preferable to have an axis of rotation that produces a particularly desired deviation (for example, an emergent beam that spans over a curved surface as the window is rotated).

Figure 10:
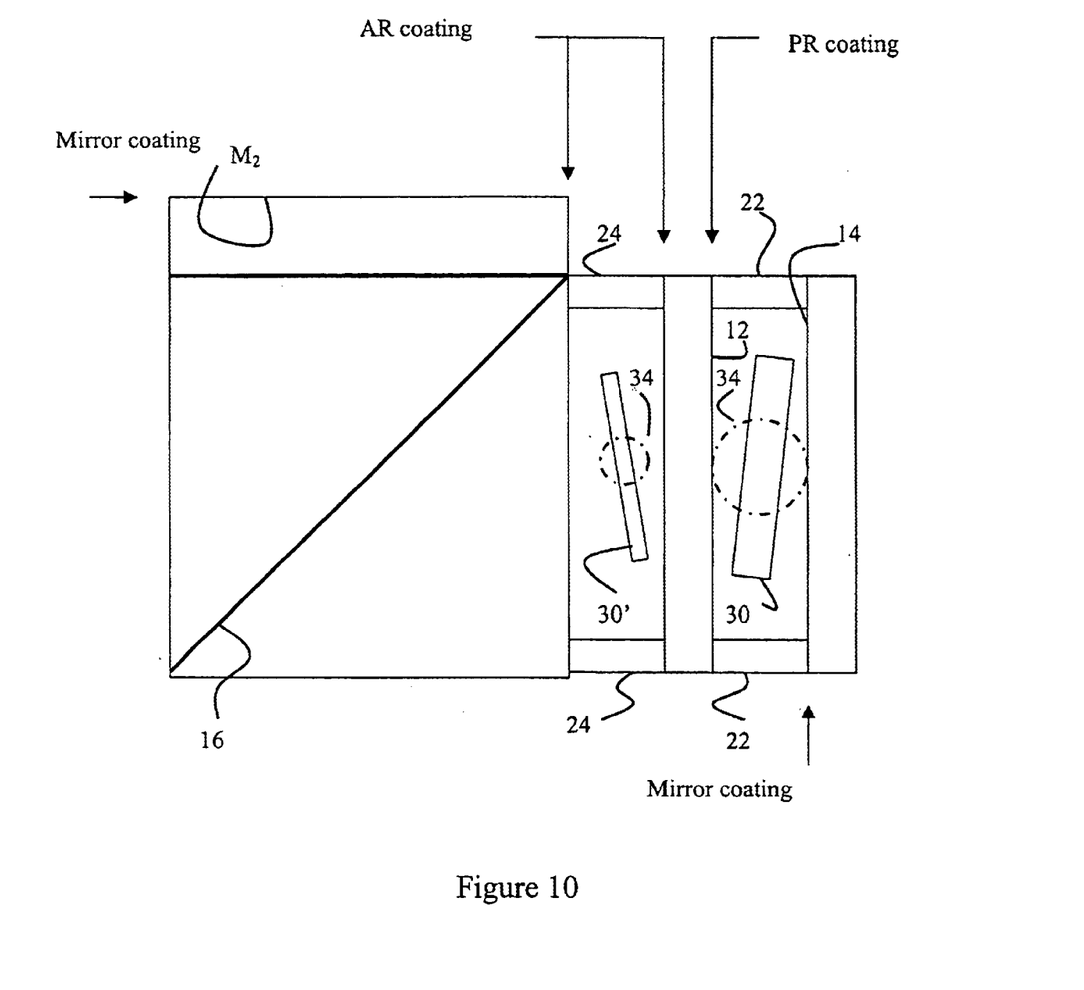
FIG. 10 is an alternative embodiment of the invention with two frequency windows combined in a single arm of a conventional interferometric interleaver in a de-multiplexer application.

Therefore, it is clear that various changes in the details and steps that have been described may be made by those skilled in the art within the principles and scope of the invention herein illustrated and defined in the appended claims. For example, the interleaver of FIG. 9 could be modified as illustrated in FIG. 10 to produce the same functional result. Instead of utilizing a frequency window in an open space along the optical path of each arm of the interleaver, both windows 30 and 30' are positioned in series in a single arm within cavities created by spacers 22,24 interposed between transparent structural members. The frequency window 30 is rotatably placed in the resonator cavity and is used to fine tune the length of the cavity $L_c$, while the frequency window 30' is placed in the open space between the splitter block and the resonator cavity and is used to vary its distance $L_1$ (FIG. 3) from the beam splitter, thereby also controlling the OPD of the system.

Thus, while the invention has been shown and described in what are believed to be the most practical and preferred embodiments, it is recognized that departures can be made therefrom within the scope of the invention, which is therefore not to be limited to the details disclosed herein, but is to be accorded the full scope of the claims so as to embrace any and all equivalent apparatus and methods.

What is claimed is:

1. A device for varying the optical path length of a light beam traveling along an optical axis, comprising:

a transparent block with an incident refractive surface and an emergent refractive surface, said transparent block being positioned so as to receive the light beam at said incident refractive surface and to produce an output beam at said emergent refractive surface;

means for rotating the transparent block and said incident and emergent refractive surfaces in fixed relation therebetween; and a partially reflective coating over either one of said incident and emergent refractive surfaces in order to vary transmittance through the transparent block.

2. The device of claim 1, wherein said transparent block is made of a material having an index of refraction, a thermal coefficient of refraction, and a coefficient of thermal expansion selected to provide a thermo-optical constant substantially equal to zero within a temperature range of operation of the device.

3. The device of claim 1, wherein the device is used in a etalon cavity formed by a spacer having a predetermined coefficient of thermal expansion interposed between two optical surfaces, and wherein said transparent block is made of a material having an index of refraction, a thermal coefficient of refraction, and a coefficient of thermal expansion selected to produce an optical path length difference that matches a change in length of the spacer in magnitude, but opposite in sign, within a temperature range of operation of the etalon.

4. The device of claim 1, wherein the device is used in combination with a reflective surface in an open space formed by a spacer having a predetermined coefficient of thermal expansion, and wherein said transparent block is made of a material having an index of refraction, a thermal coefficient of refraction, and a coefficient of thermal expansion selected to produce an optical path length difference in the transparent block that matches a change in length of the spacer in magnitude, but opposite in sign, within a temperature range of operation of the device.

5. The device of claim 1, wherein the emergent refractive surface is parallel to the incident refractive surface.

6. An interferometric interleaver comprising:

a beam splitter positioned so as to transmit a first portion of an input wavefront toward an etalon device and reflect a second portion of the input wavefront toward a mirror;

a transparent block with an incident refractive surface and an emergent refractive surface, said transparent block being positioned within a cavity of the etalon so as to receive said first portion of the input wavefront at said incident refractive surface and to produce a first output beam at said emergent refractive surface;

means for rotating the transparent block and said incident and emergent refractive surfaces in a fixed relation therebetween;

a second transparent block with a second incident refractive surface and a second emergent refractive surface, said second transparent block being positioned within an open space in front of said mirror so as to receive said second portion of the input wavefront at said second incident refractive surface and to produce a second output beam at said second emergent refractive surface; and second means for rotating the second transparent block and said second incident and emergent refractive surfaces in fixed relation therebetween.

7. The device of claim 6, further comprising a partially reflective coating over either one of said incident and emergent refractive surfaces in order to reduce transmittance through the transparent block.

8. The device of claim 6, wherein said transparent block is made of a material having an index of refraction, a thermal coefficient of refraction, and a coefficient of thermal expansion selected to provide a thermo-optical constant substantially equal to zero within a temperature range of operation of the device.

9. The device of claim 6, wherein said cavity is formed by a spacer having a predetermined coefficient of thermal expansion interposed between two optical surfaces, and wherein said transparent block is made of a material having an index of refraction, a thermal coefficient of refraction, and a coefficient of thermal expansion selected to produce an optical path length difference that matches a change in length of the spacer in magnitude, but opposite in sign, within a temperature range of operation of the etalon.

10. The device of claim 9, further comprising a partially reflective coating over either of said incident and emergent refractive surfaces in order to vary transmittance through the transparent block.

11. The device of claim 6, wherein said open space is formed by a spacer having a predetermined coefficient of thermal expansion placed in front of said mirror, and wherein said transparent block is made of a material having an index of refraction, a thermal coefficient of refraction, and a coefficient of thermal expansion selected to produce an optical path length difference that matches a change in length of the spacer in magnitude, but opposite in sign, within a temperature range of operation of the etalon.

12. The device of claim 11, further comprising a partially reflective coating over either of said second incident and emergent refractive surfaces in order to vary transmittance through the second transparent block.

13. The device of claim 6, wherein the emergent refractive surface is parallel to the incident refractive surface.

14. The device of claim 6, wherein the second emergent refractive surface is parallel to the second incident refractive surface.

15. A method of maintaining a substantially constant effective optical path length in an optical device wherein an optical path length thereof is affected by thermal effects on a structural component having a predetermined coefficient of thermal expansion, comprising the following steps:

placing a transparent block with an incident refractive surface and an emergent refractive surface so as to receive a light beam at said incident refractive surface and to produce an output beam at said emergent refractive surface; rotating the transparent block and said incident and emergent refractive surfaces in fixed relation therebetween as necessary to achieve said effective optical path length; and selecting a material for said transparent block having an index of refraction, a thermal coefficient of refraction, and a coefficient of thermal expansion selected to produce an optical path length difference that matches a change in length of the structural component in magnitude, but opposite in sign, within a temperature range of operation of the device.

* * * * *